(12) United States Patent
Kwok

(10) Patent No.: US 8,589,034 B2
(45) Date of Patent: Nov. 19, 2013

(54) SYSTEM AND METHODS FOR AN AUTOMATED SUN GLARE BLOCK AREA AND SUNSHIELD IN A VEHICULAR WINDSHIELD

(75) Inventor: Angela Karen Kwok, Township of Washington, NJ (US)

(73) Assignee: Angela Karen Kwok, Stanford, CA (US)

( * ) Notice: Subject to any disclaimer, the term of this patent is extended or adjusted under 35 U.S.C. 154(b) by 807 days.

(21) Appl. No.: 12/248,183

(22) Filed: Oct. 9, 2008

(65) Prior Publication Data

US 2010/0094501 A1    Apr. 15, 2010

(51) Int. Cl.
*B60R 22/00* (2006.01)
*E05F 15/00* (2006.01)
*G05D 1/00* (2006.01)
*G05D 3/00* (2006.01)
*G06F 7/00* (2006.01)
*G06F 17/00* (2006.01)

(52) U.S. Cl.
USPC .............. 701/49; 701/36; 701/45; 359/601; 359/609; 296/97.1

(58) Field of Classification Search
USPC ............ 701/36, 1, 45, 49; 359/275, 601, 609; 296/97.1–97.9; 345/105
See application file for complete search history.

(56) References Cited

U.S. PATENT DOCUMENTS

| | | | | |
|---|---|---|---|---|
| 4,874,938 A * | 10/1989 | Chuang | ...................... | 250/203.4 |
| 4,892,394 A * | 1/1990 | Bidabad | ........................ | 359/275 |
| 5,261,717 A * | 11/1993 | Tsumura et al. | .............. | 296/97.2 |
| 7,134,707 B2 * | 11/2006 | Isaac | ............................ | 296/97.6 |
| 7,513,560 B2 * | 4/2009 | Lin | ............................... | 296/97.4 |
| 7,604,165 B2 * | 10/2009 | Ramachandran | ............. | 235/379 |
| 2007/0210604 A1 * | 9/2007 | Lin | ............................... | 296/97.2 |
| 2009/0027759 A1 * | 1/2009 | Albahri | ........................ | 359/277 |
| 2009/0168185 A1 * | 7/2009 | Augustine | ..................... | 359/613 |
| 2009/0204291 A1 * | 8/2009 | Cernasov | ........................ | 701/36 |

* cited by examiner

*Primary Examiner* — Rami Khatib

(57) ABSTRACT

A system and methods for the automated display of a borderless sun glare block area and sunshield in a windshield, which can be made of electrochromatic glass, in a motor vehicle driven at any time and at any location on earth is presented. The first method, which accurately calculates the precise position of the sun glare block area, is based on the apparent solar position, the direction of travel relative to the true North, the slope of the road, the windshield tilt angle, and the dynamic position of the driver's eyes. It uses sets of different formulas depending on the position of the sun glare on the windshield and the slope of the road. The second method calculates the changing opacities of the borderless sun glare block area, whose opacity decreases from its center to its edge and matches that of the sunshield, based on the ambient light intensity.

6 Claims, 12 Drawing Sheets

FIG. 3A
FIG. 3B
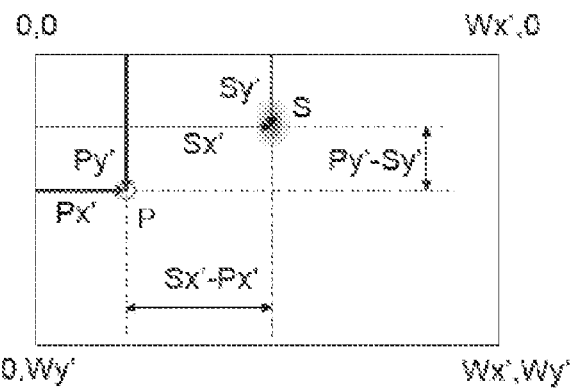
FIG. 4A
FIG. 4B
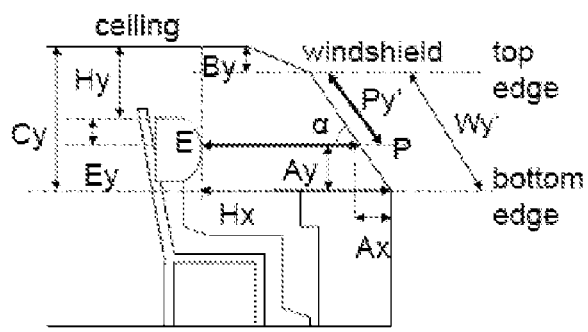

FIG. 5A
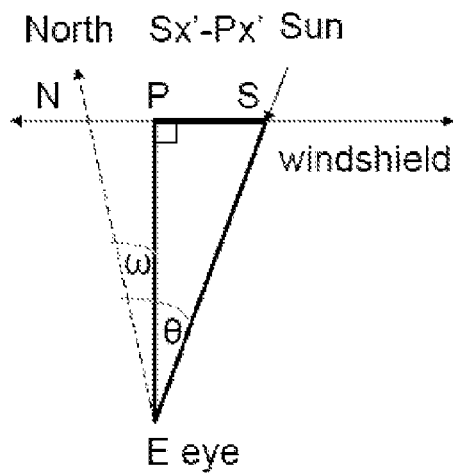
FIG. 6A
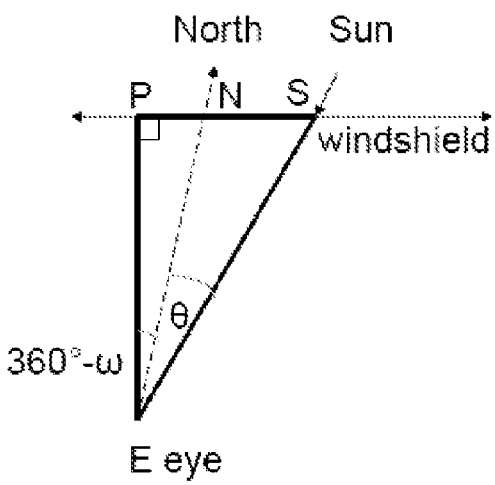
FIG. 5B
For $\theta > \omega$, $\theta - \omega < 90°$
$SP = EP \tan(\theta - \omega)$
FIG. 6B
For $\omega > \theta$, $\omega - \theta > 270°$
$SP = EP \tan(\theta + 360° - \omega)$ FIG. 7A
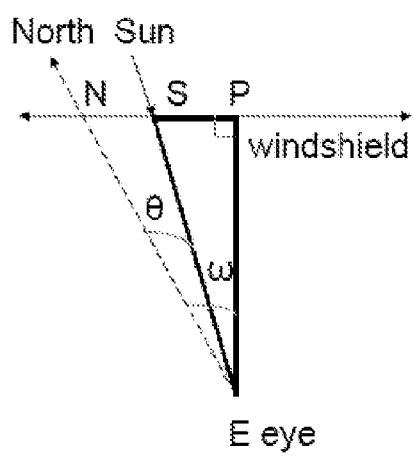
FIG. 7B
For ω > θ, ω − θ < 90°
SP = − EP tan (ω−θ)
FIG. 8A
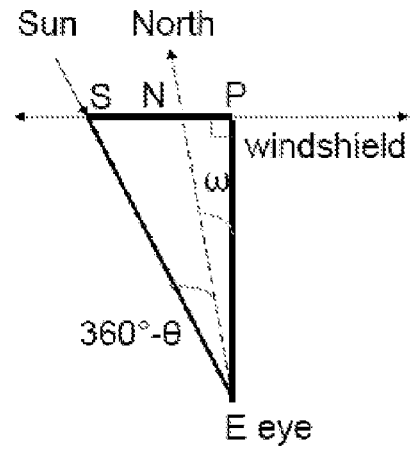
FIG. 8B
For θ>ω, θ−ω>270°
SP = − EP tan (ω+360°−θ)

FIG. 11A
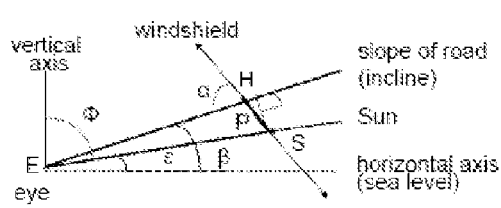
FIG. 11B
For β > 0, ε > 0, β > ε
EP = EH − PH  &  PS = PH / cos α
PH tan α = EH tan (β−ε)
PS = − EP tan (β−ε) / (sin α − cos α tan (β−ε))
FIG. 12A
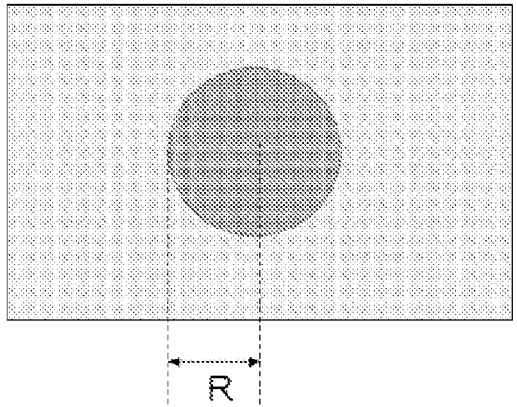
FIG. 12B
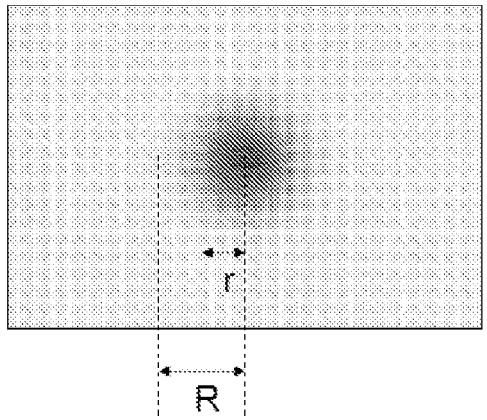
FIG. 12C
f ( r, La − Lb ) = [ f ( La − Lb ) − g ( La − Ls ) ] × ( r / R )

SYSTEM AND METHODS FOR AN AUTOMATED SUN GLARE BLOCK AREA AND SUNSHIELD IN A VEHICULAR WINDSHIELD

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Technical Field of the Invention

This invention relates generally to sun glare on a vehicular windshield, and more particularly to providing a method for the calculation of the sun glare position and a system for displaying a darkened area in the windshield to reduce the intensity of the sun glare or to block the sun glare from the driver's eyes.

2. Description of the Related Art

Sun glare is one of the most overlooked dangers of driving. It causes fatal accidents and injuries, creates highway havoc, and drastically slows traffic. The situation is worst during the height of morning and evening commutes for east- and west-bound traffic, respectively. When the sun directly perches on the horizon, a sudden, direct flash of sunlight lasting a mere decisecond can easily blind the driver. Considering the significant potential impacts of sun glare on drivers, many systems and methods of reducing or blocking sun glare have been presented in the past two decades. The most relevant arts prior to this invention are described in the following paragraphs.

Many visor extensions are available on the market and/or have been patented. Some are manual and others are automatic (U.S. Pat. No. 5,271,653, December 1993, Shirley; U.S. Pat. No. 6,286,887 B1, September 2001, Hashmi; U.S. Patent Application 2002/0130530, September 2002, Zenisek; U.S. Pat. No. 7,163,252 B1, January 2007, Neault; U.S. Pat. No. 4,923,238, May 1990, Morgulis, Tilman, Shemes). However, these visor extensions provide protection only if the sun glare is in the top region of the windshield and they may obstruct the driver's view. When the area of intense sun glare lies in the lower region of the windshield, the driver has to raise one hand to shield the sun's piercing light and keep only one hand on the steering wheel, causing a dangerous situation.

A number of inventions consist of manual laterally movable sun visors. Although these visors can move in both the vertical and horizontal directions, they still have the shortcomings of a visor because they are inconvenient and may divert the driver's attention away from the road. A movable visor that is automatically positioned laterally across the windshield and extended downward is documented in U.S. Pat. No. 4,874,938. The positioning is based on the azimuth and elevation of the sun and the angle of the sun's direction relative to the driver's eyes. Angles are detected by a complicated detection system, and the positioning requires a sophisticated motor and cable system. Although the positioning is automatic and may be accurate, the invention has the shortcomings of a visor and the system requires significant hardware additions and modifications. Other forms of sun glare shields are also available, such as an extendable sliding shield of polarized material having a black glass coating (U.S. Pat. No. 5,513,892, May 1996, Thomas). However, these also require extensive hardware addition and modification and obstruct the driver's view.

Another group of inventions employs electrochromatic elements whose transparency can be varied according to the amount of electric voltage or current applied. Some inventions involve coverings over the entire area of the windshield while others restrict the change in opacity in only the upper region, certain fixed sections, or shading bands of the windshield. Several more advanced inventions incorporate changes in opacity of the windshield from the top edge throughout the entire windshield in a propagating manner, such as in U.S. Patent Application 2007/0133078 A1. However, none of the aforementioned systems provide a method that is automatic or darkens only a specific area in the windshield needed to block the sun glare. Another related invention is an anti-dazzle device, installed between the driver and the windshield, with optical sensors that will darken the electro-sensitive screen as documented in U.S. Pat. No. 5,258,607. Although it is automatic with an optical sensor, the device is cumbersome. All the inventions noted in this paragraph unnecessarily darken areas of the windshield that are not in the path of the sun glare to the driver's eyes, which will inadvertently obstruct the driver's view.

An electrochromatic visor that darkens based on the intensity of sunlight detected, consisting of a sophisticated light-detecting apparatus for monitoring sunlight incident upon the face of the driver, is documented in U.S. Pat. No. 6,811,201 B2. The system can darken a specific required area in the visor. However, this invention has the limitation of a visor; a visor fulfills its purpose only if the sun glare is viewed in the top region of the windshield. It also requires a sophisticated digital camera and sensor system. A window pane with a visor-like segment and a glare sensor measuring the eye position of the driver is documented in DE 102005007427A1. The transparency of the segment can be adjusted based on the output signal of the glare sensor. Similar to the visor, the visor segment only serves its purpose when the sun glare area is in the top region of the windshield, and the invention requires a sophisticated glare sensor system.

An electrochromic windshield that can have a specific darkened section controlled by the driver is documented in U.S. Pat. No. 4,892,394. However, the only mode of control is manual through a touch pad that allows up-down and left-right relocation of the section. Since the system is not automatic, it will divert the driver's attention away from the road. Another invention for blocking sun glare incorporates a liquid crystal film as documented in JP 2003159942A2. The light permeability of its specific area can be varied according to signals from a light sensor system providing a visual angle that relatively matches that of the driver. The system allows an automatic darkening of a specific area. However, it requires a sophisticated and expensive sensor system.

One other invention is to provide filtering, such as the use of a liquid crystal display (LCD) screen with camera and sensors to detect the existence and position of a light source. These components, along with the visual detection of the driver, can be used to determine which portions of the LCD screen should be activated to block the light source from the driver's eyes. However, this solution has the disadvantages of being expensive, in that extra sensor and camera hardware is needed to detect not only the driver's eye position, but also the light source position.

A system that selectively attenuates the light passing through an area on an electro-optical element, coated on the windshield, is documented in U.S. Pat. No. 7,134,707 B2.

The system consists of a navigation system that determines the vehicle's location and direction of travel, a memory that contains a general location of the driver's eyes within the vehicle, an ephemeris system for providing the position of the sun, and a controller for the calculations. This invention will apply when the light source is in areas not covered by a visor and will perform automatic attenuation of the light passing through the area between the light source and the driver's eyes. Yet, there are a few limitations and complications with this invention. First, the patent does not disclose or describe the details—only the conceptual idea—on how the information from the navigation and ephemeris systems and data on the general location of the driver's eyes are translated into pixels on the electro-optical element. Second, only a generalized location of the driver's eyes is considered in the system. There is no real-time tracking of the driver's eye positions. As indicated in the patent, the driver may have to move his or her head if the light intensity attenuated areas are not in the line of sight between the glare and the driver's eyes. This would be an unnecessary strain on the driver. Third, the system does not consider the slope (inclination or declination) of the road. One of the most dangerous situations for an accident is when there is an abrupt change in the slope of the road and the sun glare will be blinding. Fourth, the patent's method provides only an estimation of the area for opacity to be attenuated because it does not consider the windshield tilt angle, which can vary substantially among different makes and models of motor vehicles.

Accordingly, the present invention offers a new system and method that overcomes the aforementioned problems and drawbacks. Contrary to prior inventions, the present system automatically blocks sun glare on the windshield for motor vehicle drivers under all typical situations and circumstances. This invention details (describes) the method of calculating the sun glare position and changing the opacity of a specific area in the windshield, or the "sun glare block area." The invention also details the method of calculating and changing the opacity, to a lesser extent than that of the sun glare block area, of the entire area of the windshield, with the windshield acting as the "sunshield."

3. References

U.S. Patent or Patent Application Documents

| | | |
|---|---|---|
| 4,874,938 | October 1989 | Chuang |
| 4,892,394 | January 1990 | Bidabad |
| 5,258,607 | November 1993 | Agostini, Agostini, Noli |
| 5,271,653 | December 1993 | Shirley |
| 5,513,892 | May 1996 | Thomas |
| 6,056,424 | May 2000 | DiNunzio |
| 6,286,887 B1 | September 2001 | Hashmi |
| 2002/0130530 | September 2002 | Zenisek |
| 6,811,201 B2 | November 2004 | Naik |
| 7,134,707 B2 | November 2006 | Isaac |
| 7,163,252 B1 | January 2007 | Neault |
| 2007/0133078 A1 | June 2007 | Fanton, Claude, Dubrenat, Schuett |

Foreign Patent Documents

| | | |
|---|---|---|
| JP 2003159942 A2 | June 2003 | Motoi, Shunichi |
| DE 102005007427 A1 | August 2006 | Sinnhuber, Wohllebe, Jan, Walter |

BRIEF SUMMARY OF THE INVENTION

This invention designs a system that would display a sun glare block area and a sunshield for a vehicular windshield by utilizing the special properties of electrochromatic glass. The system consists of the following components, at minimum: a microcontroller, a memory and storage unit, a light sensor, a global positioning system (GPS) unit, a digital clock, a digital compass, an inclinometer, a distance sensor, and a position sensor. In this system, the current ambient light intensity is continuously monitored and measured by a light intensity sensor, which is then compared with the threshold values for the sun glare block area and sunshield to determine whether the system should be "on" or "off" and used to calculate the appropriate opacities of the sun glare block area and sunshield for the comfort of the driver's eyes.

The method to calculate accurately the precise position of the sun glare on the windshield is described. The calculations entail the following parameters: the apparent solar position, the angle between the direction of travel and true North, the slope of the road, the windshield tilt angle, the projected image position of the driver's eye on the windshield, the horizontal distance from the driver's eyes to the windshield, and the vertical distance between the top of the driver's head and the driver's eyes. A distance sensor is mounted on the interior ceiling of the vehicle above the driver's seat to continuously monitor and measure the distance between the top of the driver's head and the ceiling. A position sensor is mounted along the driver's door or side panels to continuously monitor and measure the position of the driver's forehead. Different formulas and equations of this method are derived for conditions depending on the relative positions of the sun glare block area and the direct lines from the driver's eyes to the true North and to the sun glare position on the windshield, as well as the slope of the road.

There are three modes of operation in this system. A default, automatic mode is operable immediately after the installation of the system without any required setup, configuration, customization, or input from the driver. A manual mode allows the driver to manually control the position of the sun glare block area and select opacities of the sun glare block area and sunshield. A tuning mode is used to set, calculate, or adjust the vertical distance between the top of the driver's head and the driver's eyes, by adjusting the sun glare block area based on the default value such that it is in line with the sun glare on the windshield when viewed by the driver using reverse calculations. In this system, all the calculations are implemented either through a device driver in the microcontroller or within software deployed on an optional microprocessor.

The proposed system of this invention has a number of advantages. The system encompasses all possible locations of intense sun glare on the windshield. The system can darken the minimum area needed to block the sun glare because the system uses an accurate method to calculate the precise position of the sun glare on the windshield, thus maintain a clear and unobstructed view of the road. The system can display a borderless sun glare block area with a central area of higher opacity to block the center of the sun glare, along with a gradient of decreasing opacity from its center to its edge with the outer opacity matching the opacity of the sunshield. These two features provide more comfort to the driver's eyes by shielding sun glare and sunlight, while maintaining a large area of clear vision for the road. The system can function correctly at any location and at any time, as well as for any direction of travel and on roads with any slope. The system is fully automatic to retain and maintain the driver's undivided attention for driving. The system can be operated automatically and immediately after the installation of the system without any preliminary requirements for the setup, configuration, or customization from the driver.

BRIEF DESCRIPTION OF THE DRAWINGS

The foregoing and other objects, features, and advantages of the invention are apparent from the following detailed description taken in conjunction with the accompanying drawings which are used to show the overall system, flowcharts and calculations in which:

FIG. 3 illustrates the front view (XY view) of the windshield, showing coordinates of the windshield and the driver's projected eye position;

FIG. 4 illustrates the side view (YZ view) of the driver and the windshield, showing the eye horizontal perpendicular projected position on the windshield;

FIG. 5 is the top view (XZ view) of the windshield, showing calculation of the block area horizontal position Sx (x-coordinate) on the windshield for Case 1;

FIG. 6 is the top view (XZ view) of the windshield, showing calculation of the block area horizontal position Sx (x-coordinate) on the windshield for Case 2;

FIG. 7 is the top view (XZ view) of the windshield, showing calculation of the block area horizontal position Sx (x-coordinate) on the windshield for Case 3;

FIG. 8 is the top view (XZ view) of the windshield, showing calculation of the block area horizontal position Sx (x-coordinate) on the windshield for Case 4;

FIG. 11 is the side view (YZ view) of the windshield and the road showing calculation of the block area vertical position Sy (y-coordinate) on the windshield for Case 3;

FIG. 12 illustrates a circular sun glare block area with constant opacity and a borderless circular sun glare block area with gradient opacities;

Figure 1:
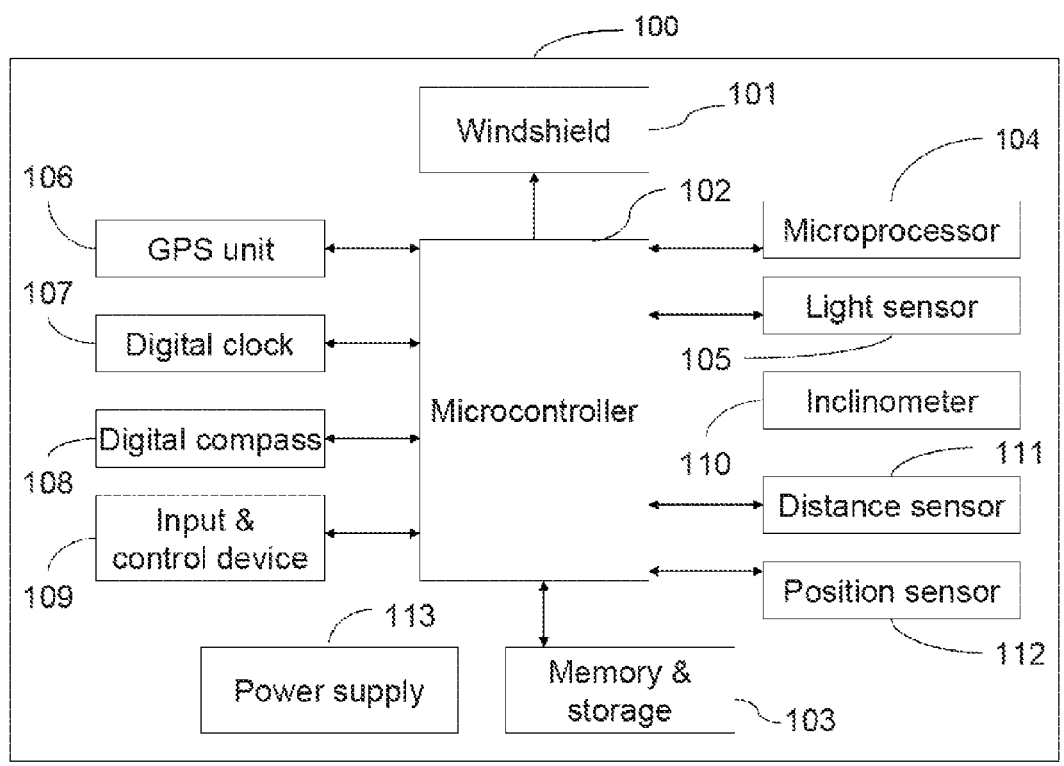
FIG. 1 is a layout of different components of the overall system.

The detailed description explains the preferred embodiments of the invention, together with advantages and features, by way of example with reference to the drawings.

DESCRIPTION OF THE REFERENCED NUMERALS AND LETTERS

The following characters, letters, and symbols are used to denote elements in the drawings throughout the various figures:

| | |
|---|---|
| North | the true North direction |
| Ax | intermediate variable used in calculation of EP |
| Ay | intermediate variable used in calculation of EP |
| By | vertical distance between the ceiling and the windshield |
| Cy | vertical distance between the ceiling and the dashboard |
| E | position of the driver's eyes |
| Ey | vertical distance between the driver's crown and eyes |
| EP | horizontal perpendicular distance from the driver's eyes to the windshield |
| f | function for opacity of sun glare block area at distance r from center |
| g | function for opacity of sunshield |
| Hx | horizontal distance between the windshield bottom edge to the driver's forehead |
| Hy | vertical distance between the ceiling and the driver's crown |
| La | ambient light intensity |
| $L_B$ | threshold value of light intensity for sun glare block area |
| $L_S$ | threshold value of light intensity for sunshield |
| N | intersection of the direct line of sight from the eyes towards the true North with the windshield |
| P | position of the image of the driver's eyes horizontally perpendicular projected from the driver onto the windshield |
| PS | distance between P and S in XZ top view or YZ side view |
| Px' | X' coordinate of P |
| Py' | Y' coordinate of P |
| r | radius from center of sun glare block area S, a value between 0 and R |
| R | radius of sun glare block area S |
| S | center position of the sun glare block area in the windshield |
| SP | distance between S and P in XZ top view or YZ side view |
| Sx' | X' coordinate of S |
| Sy' | Y' coordinate of S |
| Wx' | width of windshield |
| Wy' | height of windshield |
| X | X-axis, axis along the horizontal width of the vehicle |
| X' | X'-axis, axis across the width of the windshield |
| Y | Y-axis, axis along the vertical height of the vehicle |
| Y' | Y'-axis, axis along the surface of the windshield |
| Z | Z-axis, axis along the length of the vehicle |
| α | tilt angle between the slanted windshield and the horizontal level of the motor vehicle |
| β | slope of the road relative to the sea level |
| ε | solar altitude angle, $\varepsilon = 90° - \Phi$ |
| θ | solar azimuth angle |
| Φ | solar zenith angle |
| ω | angle between the direction of the road and the direction of true North |

DETAILED DESCRIPTION OF THE INVENTION

The invention is described hereinafter in detail with reference to the accompanying drawings, which forms a part of this specification. This detailed description focuses on an innovative method to accurately calculate the precise position and opacities of the sun glare block area and a first-of-its-kind system to display it in the windshield of a motor vehicle.

As stated in the background on the calculation of the sun glare position on the windshield, prior arts do not disclose or provide a detailed description on how to obtain the precise position of the sun glare on the windshield. Some prior arts provide only a conceptual approach on the estimation or approximation of the sun glare position on the windshield assuming a fixed position of the driver's eyes. Whenever the driver has a small movement of his or her head during driving, the sun glare block area will cover only part of the sun glare for the driver's eyes. In this invention, an accurate calculation of the precise sun glare position on the windshield is disclosed and described in detail by including three essential parameters, which all prior arts have neglected. These three essential parameters are the slope of the road (inclination or declination), the windshield tilt angle (the angle between the slanted windshield and the horizontal level of the motor vehicle), and the movement of the driver's head while driving. The importance of these three essential parameters to the accurate calculation of the precise sun glare position on the windshield will become apparent from the detailed description in the following sections.

In order to change the opacity of a specific area on the windshield, the following challenges have to be overcome and solutions to these challenges need to be provided. First, a material capable of varying in opacity depending on a set of criteria has to be chosen for the windshield. The windshield can be any multi-layer composite, with a functional layer of elements capable of reversibly changing opacity by varying the amount of the electric voltage or current applied. An example is electrochromatic glass, a multi-layer system that consists of at least one electrochromic functional layer enclosed between two layers of surface electrodes. When voltage is applied, the voltage catalyzes an oxidation reaction. The conductor drives the ions from the ion-storage layer to the ion conductor layer and into the electrochromic layer. The ions in the electrochromic layer allow light to be absorbed and the glass becomes opaque. When the voltage is removed, the ions return to the ion-storage layer and the glass becomes transparent. The electrochromic materials are already being used in automobile auto-dimming rearview mirrors, sun roofs, and side windows.

Second, the apparent position of the sun (hereinafter referred to as "apparent solar position") in the sky has to be calculated. The "apparent solar position" is termed "apparent" because the solar position is what the observer sees on the apparent horizon. The geometric horizon is the horizon that would appear to an observer at sea level on a perfectly level earth without atmospheric effects. In practice, the apparent horizon is the horizon that appears to an observer. There are a few different ways to define the apparent solar position. For this invention, the apparent solar position is defined in terms of its solar zenith or altitude angle (complement of the solar zenith angle) and the solar azimuth angle. Third, an accurate method to translate the sun's position to the precise position of the sun glare on the windshield has to be provided. Equations and formulas have to be derived for the method and should include the slope of the road and the windshield tilt angle since the windshield tilt angle can vary between different makes and models of vehicles. Fourth, an algorithm for calculating the opacities of the sun glare block area pixels in the windshield and the entire area of the windshield according to the ambient light intensity has to be constructed. Fifth, input data has to be obtained from different devices and sensors with system integration. Sixth, the movement of the driver's head during driving has to be continuously monitored and measured for the recalculation of the sun glare position on the windshield. Lastly, the system has to be automated.

1. The System for the Invention

FIG. 1 is the schematic layout of the system 100 for the invention with block diagrams showing its major components, devices, and sensors. These components, devices, or sensors can be installed in the motor vehicle during its manufacture. They can also be subsequently added to the motor vehicle as embedded or standalone components, devices, or sensors. These major components, devices, and sensors include the windshield 101, the microcontroller 102, the memory and storage unit 103, the optional microprocessor 104, the light intensity sensor 105, the Global Positioning System (GPS) unit 106, the digital clock 107, the digital compass 108, the input and control device 109, the inclinometer 110, the distance sensor 111, the position sensor 112, and the power supply 113.

The windshield 101 can be any multi-layer composite, with an incorporated functional layer composed of many tiny individual elements capable of changing opacity reversibly by electric control. Any other material with similar functions can also be used as the windshield. Electrochromatic glass is a potential candidate for the windshield. The microcontroller 102 communicates with and controls all other components, devices, and sensors in the system. It controls the location of the sun glare block area and the opacities of its pixels in the windshield. It also controls the opacity of the remaining area beyond the sun glare block area in the windshield. The opacity is controlled by applying different amounts of voltage to the electrodes in the windshield. The microcontroller 102 stores and retrieves the system constants, the default and preset values of the system parameters and customized data, and the temporary variables and data for calculations to and from the memory and storage unit 103. It retrieves, receives, and synchronizes data from all other components, devices, and sensors in the system. It carries out all the required calculations described in this invention. Alternatively, it can send requests for calculations to an optional microprocessor and receives results from the optional microprocessor 104 to increase the performance of the system 100. The memory and storage unit 103 stores all the temporary data retrieved from other components, devices, or sensors in the system. It stores the system constants, such as the windshield tilt angle and its dimensions. It stores the default and preset values of the system parameters, such as the threshold values for the sun glare block area and sunshield. It stores the customized data, such as the distance between the driver's crown (top of the head) and eyes. It also stores the temporary variables and data for calculations.

The GPS unit 106 continuously monitors and updates the position of the motor vehicle from satellites in terms of its latitude and longitude 202. The digital clock 107, which is in synchronization with the GPS unit 106, provides instantaneous data on the time zone, the current year, the day of the year, and the time of day 203 for the motor vehicle. These data are for the calculation of the apparent solar position 212. Any new or alternative wire or wireless component or device that can provide the apparent solar position 212 relative to the motor vehicle at any time and at any location on earth can substitute for the GPS unit 106 and the digital clock 107. The digital compass 108 monitors and provides the instantaneous direction of travel 204 of the motor vehicle. Alternatively, an expensive system consisting of a navigation system and an ephemeris system, as used in one of the prior arts, can be used to provide the direction of travel 204 and the apparent solar position 212. The inclinometer 110 measures the angle of inclination or declination and the slope of the road 205. The light intensity sensor 105 monitors and measures the ambient sunlight intensity 201 at the windshield. The input and control device 109 can be a touch screen or pad, a joystick, a keyboard, a voice input or control device with a speech recognition system, or any other wired input or control devices on the dashboard, front or side panels, or the steering wheel, as well as any other wireless remote input and control devices.

The dynamic driver's eye position relative to the windshield 101 can be calculated from the vertical position of the driver's crown, the horizontal distance between the driver's forehead and the windshield, and the vertical distance between the driver's crown and eyes. The vertical position of the driver's crown is measured by a distance sensor 111 mounted on the interior ceiling above the driver's seat. The horizontal distance between the driver's forehead and the bottom edge of the windshield 101 is continuously monitored, measured, and calculated by a position sensor 112 located along the driver's door or side panels. Two sets of position sensors, one set along the driver's door or side panel as emitters and another set along the passenger's side door or panel as receivers, can be used. Alternatively, a distance sensor 111 mounted on the top edge of the windshield 101 can also be used. These sensors can be any laser, infrared (IR), triangulation-based, or ultrasonic sensors. The distance sensor can be any precision or magnetic distance sensor with time-of-flight measurement. The position sensor can be any linear, magnetostrictive, or inductive position sensor. The vertical distance between the driver's crown and eyes can be entered by the driver through the input and control device 109. The distinct value of this crown to eye vertical distance for each driver of a household is stored in the memory and storage unit 103 as the preset value of the customized data. All the components or devices in the system 100 are powered by the power supply 113. This power supply 113 can be the same as or an extension of the existing power supply in the motor vehicle.

There are three modes of operation in the system 100: the automatic, manual, and tuning modes. The default automatic mode is operable immediately after the installation of the system without any requirements for the setup, configuration, customization, or input from the driver. In the manual mode, the driver can override certain steps or processes of the automatic mode. The driver can also manually control the position and opacity of the sun glare block area and/or the opacity of sunshield in the windshield 101 using the input and control device 109. This manual function would be most useful in the evening for blocking glare from headlights of motor vehicles traveling in the opposite direction. In this case, the sun glare block area will act as a headlight glare block area. The tuning mode is an advanced function that is not documented in any of the prior arts. The tuning mode is used to set, calculate, or adjust the system parameters or customized data, such as the vertical distance between the driver's crown and eyes.

2. Methodology of the Invention

Figure 2:
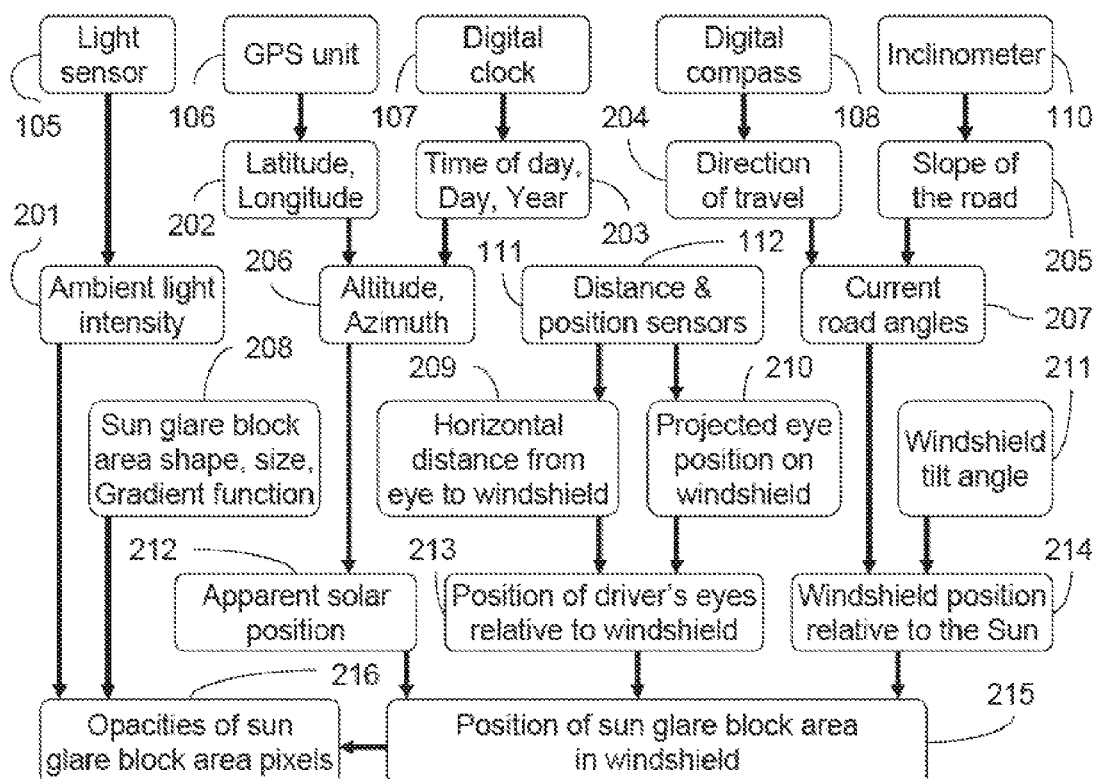
FIG. 2 shows the method of calculation of the sun glare block area position.
Figure 9A:
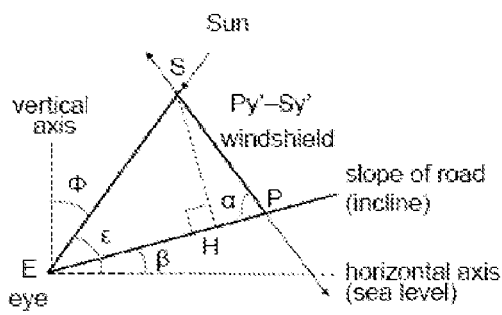
FIG. 9 is the side view (YZ view) of the windshield and the road showing calculation of the block area vertical position Sy (y-coordinate) on the windshield for Case 1.
Figure 10A:
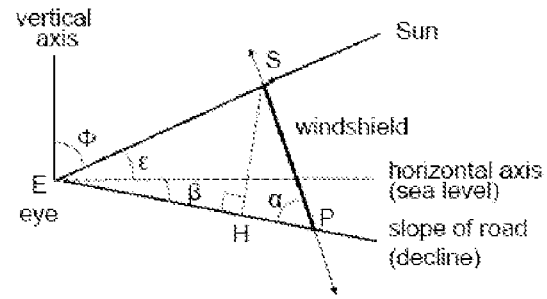
FIG. 10 is the side view (YZ view) of the windshield and the road showing calculation of the block area vertical position Sy (y-coordinate) on the windshield for Case 2.
Figure 9B:
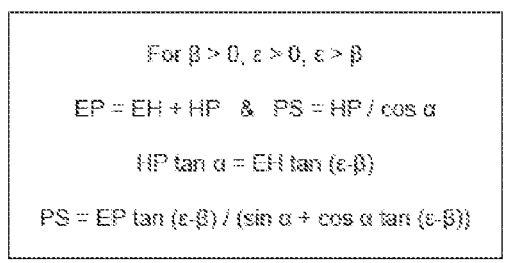
Figure 10B:
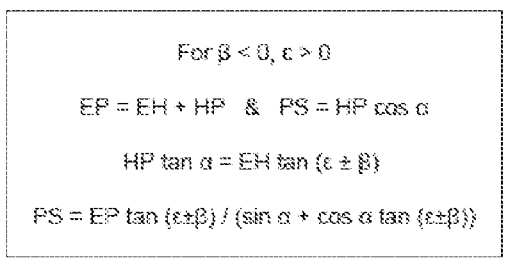

To reduce the sun glare intensity or to block the sun glare from a driver's eyes, the position of the sun glare on the windshield 215 as observed by the driver must be determined. In this invention, the calculated position of the sun glare on the windshield 215 as observed by a driver depends on the apparent position of the sun 212, the windshield position relative to the sun 214, and the position of the driver's eyes relative to the windshield 213. The flow diagram in FIG. 2 summarizes the methodology used to calculate the position of the sun glare block area 215 and the opacities of its pixels 216.

The apparent solar position 212 is defined by its solar zenith angle $\Phi$ and its solar azimuth angle $\theta$ 206. The solar zenith angle $\Phi$ is the complementary angle of the elevation or solar altitude angle $\epsilon$, which is the angle of the sun above the driver's horizon from 0 to 90 degrees, such that $\epsilon=90°-\Phi$. The solar azimuth angle $\theta$ is the angular direction of the sun measured along the horizon from the true North towards the East from 0 to 360 degrees. The solar azimuth, zenith, and altitude angles can be computed based on formulas provided by the U.S. Department of Commerce National Oceanic and Atmospheric Administration (NOAA). Using the formulas, the solar position is first calculated in the equatorial celestial coordinate system in terms of its coordinates, solar declination, and solar hour angle from the vehicle's longitude 202, the day of the year with leap year adjustments, and the time of day with time zone and daylight savings time adjustments 203. The solar position is then converted to the horizontal celestial coordinate system in terms of the solar altitude angle and solar azimuth angle 206 based on the vehicle's latitude 202.

In this invention, the windshield position relative to the sun 214 is found to depend on the direction of travel 204, the slope of the road 205, and the windshield tilt angle $\alpha$ 211. The direction of travel 204 is defined as the angle $\omega$ 207 between the current direction of the road and the direction of true North. The direction of magnetic North can be monitored and measured by a digital compass 108. The difference between true North and magnetic North, commonly called compass North, is the magnetic declination. The magnetic declination at any position on earth can be obtained from the NOAA database. The magnetic North direction is then converted to the true North direction by adding or subtracting the correct magnetic declination. The slope $\beta$ of the road 205 can be continuously monitored and measured by an inclinometer 110. The windshield tilt angle $\alpha$ 211 is defined as the angle between the slanted windshield and the horizontal level of the motor vehicle. It is a fixed value for a particular vehicle make and model. The position of the driver's eyes relative to the windshield 213 is defined by the windshield coordinates of the image of the driver's eyes 210 projected horizontally onto the windshield 101, and the horizontal perpendicular distance 209 from the driver's eyes to the windshield 101.

To calculate the sun glare position on the windshield 215, a 3-D coordinate system is used to define the windshield position 214, positions of the driver's eyes 213, and the image of the driver's eyes projected onto the windshield 210. The following figures show different views to illustrate the coordinates.

In the calculation, the windshield 101 of a motor vehicle is assumed to be a flat glass, which produces a negligible difference in the results even though the glass has very minor curvatures in both the horizontal and vertical directions. FIG. 3A shows a front X'Y' view of the windshield, with the driver facing the windshield, where the X'-axis is the axis along the horizontal width of the windshield and the Y'-axis is the axis along the surface of the windshield. The dimensions of the windshield are Wx' by Wy', with its origin at its upper left corner. The center of the sun glare block area, referred to as "sun glare block position," on the windshield is represented by S with coordinates (Sx', Sy'). The position of the image of the driver's eyes horizontally projected onto the windshield, referred to as "projected eye position," is represented by P with coordinates (Px', Py'). Px' is a fixed value for a particular motor vehicle model since as of this date a driver does not have the option to adjust the seat position sideways, or left and right, along the width or X-axis in a motor vehicle. The equations of their relationships are given in FIG. 3B.

FIG. 4A is a YZ side view of the driver and the windshield 101, showing the eye position E and its horizontally projected position P on the windshield 101, where the Y-axis is the vertical axis along the height of the motor vehicle between the floor and ceiling of the motor vehicle and the Z-axis is the horizontal axis along the length of the motor vehicle between the driver and the windshield 101. Let the vertical distance between the ceiling and the top edge of the windshield be By, the vertical distance between the ceiling and the dashboard be Cy, the horizontal distance between the bottom edge of the windshield and the front of the head be Hx, the vertical distance between the ceiling and the top of the head be Hy, and the vertical distance between the crown and the eyes be Ey. The values of By and Cy are fixed for a specific vehicle model. The value of Hy can be measured by a distance sensor mounted on the ceiling above the driver's seat. The value of Hx changes when the driver moves his or her head while driving. It can be continuously monitored and measured by a set of position sensors mounted along the driver's side door or panel acting as both emitters and receivers. The value of Ey is fixed for a specific driver and customized for each driver. Distinct values of Ey can be stored for different drivers in a household. Alternatively, a default value for an average Ey or a value obtained from the reverse calculation in the tuning mode for a specific driver can be used. FIG. 4A is the basis for the calculation of Py' and EP along the Z-axis. Py' is a function of the image position of the driver's eyes 213 projected onto the windshield and the windshield tilt angle α 211. The equations solved by trigonometry are given in FIG. 4B.

A key part of this invention is to derive a set of equations to calculate the distance between S and P, in particular (Sx–Px) and (Py–Sy'), under all possible conditions.

FIG. 5A through FIG. 8A are XZ top views of a motor vehicle showing the windshield, the driver's eye position E, and the image position P of the driver's eyes horizontally projected onto the windshield for the four possible cases. The point S is the center position of the sun glare, which is the intersection of the direct line of sight from the eyes towards the Sun with the windshield. The point N is the intersection of the direct line of sight from the eyes towards the true North direction with the windshield. Thus, the angle between the direction of travel EP and the direction of the eyes towards the Sun ES is the solar azimuth angle θ. Let ω be the angle between the direction of travel EP and the true North direction EN. There are four possible cases depending on the position of P relative to positions of S and N. These four cases are also reflected in different ranges of values for θ and ω, where Case 1 is for θ>ω and θ−ω<90°, Case 2 is for ω>θ and ω−θ>270°, Case 3 is for ω>θ and ω−θ<90°, and Case 4 is for θ>ω and θ−ω>270°. In this view, the calculations are for only the X'-coordinate. The equations to calculate the segment (Sx'−Px') under the four cases are given in FIG. 5B through FIG. 8B. The equations are functions of EP, θ, and ω, and are distinct for each of the four cases.

FIG. 9A through FIG. 11A are YZ side views of a motor vehicle showing the windshield, the vertical and horizontal axes, the slope of the road, the driver's eye position E, and the image position P of the driver's eyes horizontally projected onto the windshield for three possible cases. The point S is the center position of the sun glare, which is the intersection of the direct line of sight from the eyes towards the Sun with the windshield. The point H is on the line EP where the line SH is perpendicular to the line EP. Thus, the angle between the direction of the eyes towards the Sun ES and the vertical level is the solar zenith angle Φ. Since the complementary angle of the solar zenith angle Φ is the solar altitude angle ε, which is 90°−Φ, the angle between that and the horizontal sea level is the solar altitude angle ε. Let β be the angle between the direction of travel EP and the horizontal sea level and α be the windshield tilt angle, the angle between the slanted windshield and the horizontal level of the motor vehicle. There are three possible cases depending on the position of P relative to positions of S and whether the road is on an incline or a decline. These three cases are also reflected in different ranges of values for ε and β, where Case 1 is for β>0, ε>0, and ε>β; Case 2 is for β<0 and ε>0, and Case 3 is for β>0, ε>0, β>ε. In this view, the calculations are for only the Y'-coordinate. The equations to calculate the segment (Py'−Sy') under the three cases are given in FIG. 9B through FIG. 11B. The equations are functions of EP, ε, β, and α, and are distinct for each of the three cases.

The ambient light intensity La is continuously monitored and measured by a light sensor. Let the threshold values for the sun glare block area and sunshield be $L_B$ and $L_S$, respectively. The value of La triggers the "on/off" of the sun glare block area and sunshield for the comfort of the driver's eyes by the comparison of La with $L_B$ and $L_S$. On a bright sunny day, both the sun glare block area and the sunshield will be "on." When the sun glare block area is beyond the windshield, the sunshield is still displayed in the windshield. On a mostly cloudy day with a bright sun, only the sun glare block area will be "on," since the ambient light is not bright enough for a sunshield to be beneficial. In fact, the driver will have a clearer view of the road without the sunshield. Thus, the threshold value for the sun glare block area is always lower than that for the sunshield ($L_B < L_S$).

When the ambient light intensity is higher than the threshold value for the sun glare block area (La>$L_B$), the percentage of opacity for the sun glare block area will be calculated. The percentage of opacity for the sun glare block area will be a function of the difference between La and $L_B$: f(La−$L_B$). When the ambient light intensity is lower than the threshold value for the sun glare block area (La<$L_B$), opacity for the sun glare block area will be zero percent. Similarly, when the ambient light intensity is higher than the threshold value for sunshield (La>$L_S$), the percentage of opacity for sunshield will be calculated. The percentage of opacity for sunshield will be a function of the difference between La and $L_S$: g(La−$L_S$). When the ambient light intensity is lower than the threshold value for sunshield (La<$L_S$), the opacity for sunshield will be zero percent. These two functions, f(La−$L_B$) and g(La−$L_S$), can be linear functions, polynomial functions of any degree, logarithmic functions, or any other functions. The function can be preset and stored in the memory and storage unit 103 or specified by the driver by selecting an option on the input and control device 109.

In summary, when the ambient light intensity is below the threshold values for the sun glare block area and the sunshield, the windshield will be completely transparent at zero opacity. This will be the situation in the evening and on a cloudy or rainy day. When the ambient light intensity is below the threshold value for the sunshield but above the threshold value for the sun glare block area, the windshield will be transparent except for the sun glare block area. When the ambient light intensity is above the threshold values for both the sun glare block area and the sunshield, the windshield will be at an optimal or desired opacity, with a higher opacity for the sun glare block area when required to block the sun glare from the driver's eyes.

The sun glare block area can be of any shape and size. Its opacity can be constant throughout the block area or vary with decreasing magnitude from its center to its edge according to a gradient function. In this invention, a new feature of the sun glare block area is proposed. The sun glare block area is a circle with radius R and the opacity of its pixels decrease linearly from its center to its edge to blend with the opacity of sunshield. This new feature renders the sun glare block area borderless to the driver's view. FIG. 12A shows the case where the sun glare block area is circular with radius R and constant opacity. In this case, the sun glare block area is not opaque enough at its center to provide sufficient comfort to the driver's eyes with the sun glare, but at the same time obscures the immediate areas around the sun glare. FIG. 12B shows the same circular shape with a gradient opacity and radius R, where the edge is borderless to the driver's view. In this case, the center area of the sun glare block area is opaque enough to provide more comfort to the driver's eyes with the sun glare and the more transparent areas near the edges provide greater visibility. Furthermore, the borderless sun glare block offers another advantage because the borderless sun glare block area does not have any distracting edges.

To display the opacities of the sun glare block area in the windshield, four pieces of data are required: the center position of the sun glare (Sx', Sy'), the shape of the sun glare block area, the size of the sun glare block area, and the gradient function for the sun glare block area. After obtaining the center position (Sx', Sy') of the sun glare, the opacity of each pixel in the sun glare block area is calculated based on the ambient light intensity La. The opacity of a pixel at a distance r away from the center of the sun glare block area is a function of the distance r and the difference between La and $L_B$: $f(r, La-L_B)$, known as the gradient function. An example of a linear gradient function is given in FIG. 12C. In cases where the shape of the sun glare block is not circular, its pixel opacities can be calculated accordingly. The sunshield has a simpler calculation since the opacity is constant for the entire area of the windshield. The coordinates of the area will be from 0 to Wx' in the X'-axis and from 0 to Wy' in the Y'-axis.

A microcontroller 102 in the system 100 is used to control the position and opacities of the sun glare block area and the sunshield in the windshield 101. The calculated constant opacity of the sun shield is converted by the microcontroller to an input value for an amount of voltage to be applied to the electrodes of all areas on the windshield. Similarly, the calculated opacity of each pixel of the sun glare block area is converted by the microcontroller to an input value for an amount of voltage to be applied to the electrode of the corresponding area on the windshield. The sun glare block area voltages applied to electrodes of the sun glare block area override the sunshield voltage applied to the same area.

Similar to the sun glare block area for the driver, a second sun glare block area can be calculated in a similar manner and displayed on the windshield to reduce or block sun glare for the front passenger. In this case, the position of the sun glare block area is calculated based on the position of the passenger's eyes instead of the driver's eyes. The opacity of the second sun glare area for the passenger is much lower than that of the sun glare block area for the driver to avoid creating a distraction for the driver. Other sun glare block areas can also be calculated in a similar manner and displayed on side windows to reduce or block sun glare for the driver and passengers. Moreover, this invention can be applied as a sun shade, shielding the interior of a motor vehicle from intense sun in summer months when the vehicle is parked or with the motor off. In this case, the front, side, and rear windows can be darkened based on a light intensity sensor and a temperature sensor in the motor vehicle or other setting by the driver. This invention can also be applied to darken all windows of a motor vehicle for privacy purposes when someone is near or approaching the motor vehicle based on proximity sensors and motion detectors. Furthermore, the sun glare block area can be used to block glare from any reflective surfaces in the driver's view.

3. Algorithms for the Methods of the Invention

FIG. 13 through FIG. 17 describe the algorithms for the methods to calculate the position of the sun glare block area and opacity of its pixels in the windshield 101. The flowcharts have block diagrams to represent the system events, decisions, connectors, steps, and processes; and arrows to represent their logical flows, the implementation and execution of algorithm of the system 100, and methods of this invention.

First, the microcontroller 102 analyzes the ambient light intensity data 201 from a light sensor 105 to determine whether the sun glare block area and/or the sunshield is/are necessary for the comfort of the driver's eyes. If either is needed, the microcontroller 102 calculates the position of the sun glare block area 215 in the windshield based on the apparent solar position 212, the windshield position relative to the Sun 214, and the position of the driver's eyes relative to the windshield 213 during driving. Then, it calculates the appropriate opacities of the sun glare block area 216 and/or sunshield that would reduce the sun glare on the windshield 101 and maintain optimal visibility for the driver.

Figure 13:
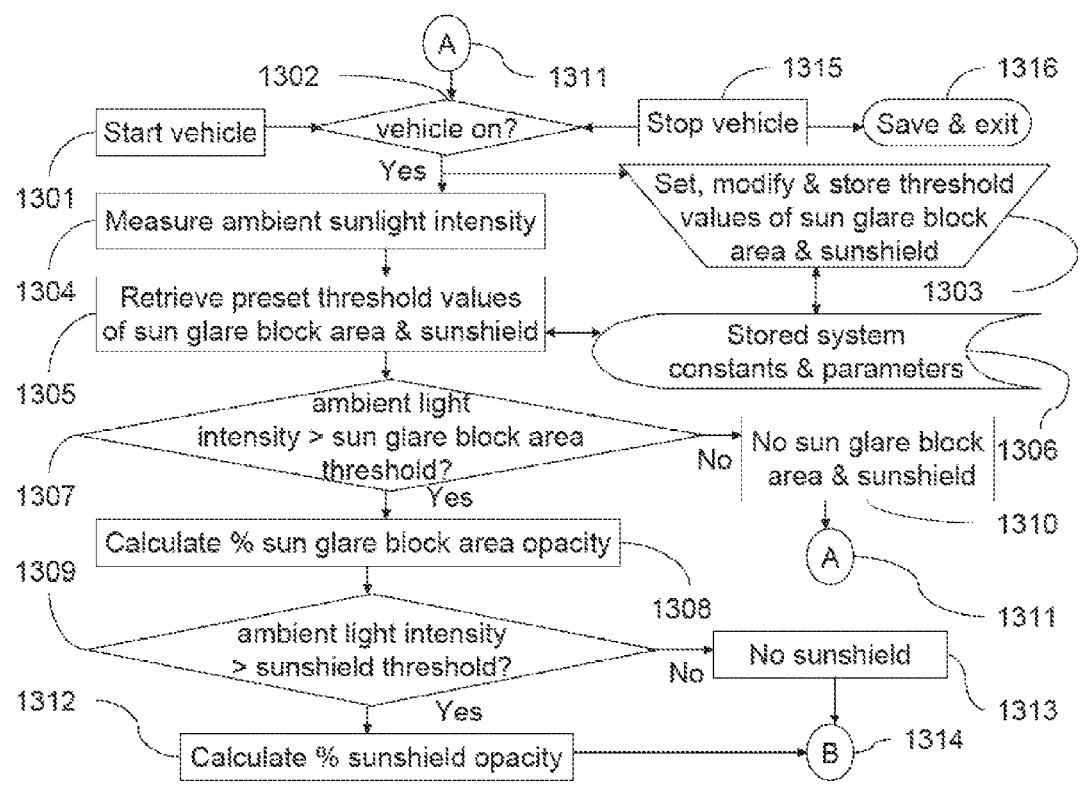
FIG. 13 is a flow diagram with steps for determining if a sunshield and/or sun glare block area are beneficial or necessary.

FIG. 13 is a block diagram that shows the system events, decisions, connectors, steps, and processes as well as their logical flows from event 1301, when the motor vehicle is started, to determine whether the sun glare block area and/or sunshield is/are required. Event 1301, when the motor vehicle is started, triggers the start of processes in the system 100. It also sets decision 1302 to "Yes." With a result of "Yes" on decision 1302, any time the motor vehicle is on, the driver has the option to set or modify the threshold values for the sun glare block area and the sunshield using the input and control device 109 at step 1303. Then these threshold values are stored as the preset values of the system parameters 1306 in the memory and storage unit 103. At step 1304, the ambient sunlight intensity 201 is continuously monitored and measured by a light intensity sensor 105. At step 1305, the threshold values for the sun glare block area and the sunshield are automatically retrieved from the stored preset values of the system parameters 1306 in the memory and storage unit 103 by the microcontroller 102 without any action by the driver. If no preset value is found, the stored default values of the system parameters 1306 are retrieved. The decision 1307 checks if the ambient light intensity 201 is greater than the threshold value for the sun glare block area. If the result is "Yes" on 1307, the percentage of opacity for the sun glare block area is calculated at step 1308. Then the system process proceeds to decision 1309. If the result is "No" on 1307, the system process will bypass the calculations for the opacities of the sun glare block area and the sunshield at step 1310. However, because this is an ongoing, continuous, and repetitive process, the system process will return to connector A 1311 and repeat the steps 1304, 1305, and 1307 if the motor vehicle is still on as determined by decision 1302. Next, decision 1309 checks if the ambient light intensity 201 is greater than the threshold value for the sunshield. If the result is "Yes" on 1309, the percentage of opacity for the sunshield is calculated at step 1312. Then the system process proceeds to connector B 1314 in FIG. 14, FIG. 15 and FIG. 16 for the calculations of the apparent solar position 212, the windshield position relative to the Sun 214, and the position of the driver's eyes relative to the windshield 213, respectively. If the result is "No" on 1309, the system process will bypass the calculation for sunshield opacity at step 1313, but the system process will proceed directly to connector B 1314. Event 1315, when the motor vehicle is stopped, triggers the saving of all system parameters and the stopping of all system processes 1316 in the system 100. It also sets the decision 1302 to "No" and exits 1316.

Figure 14:
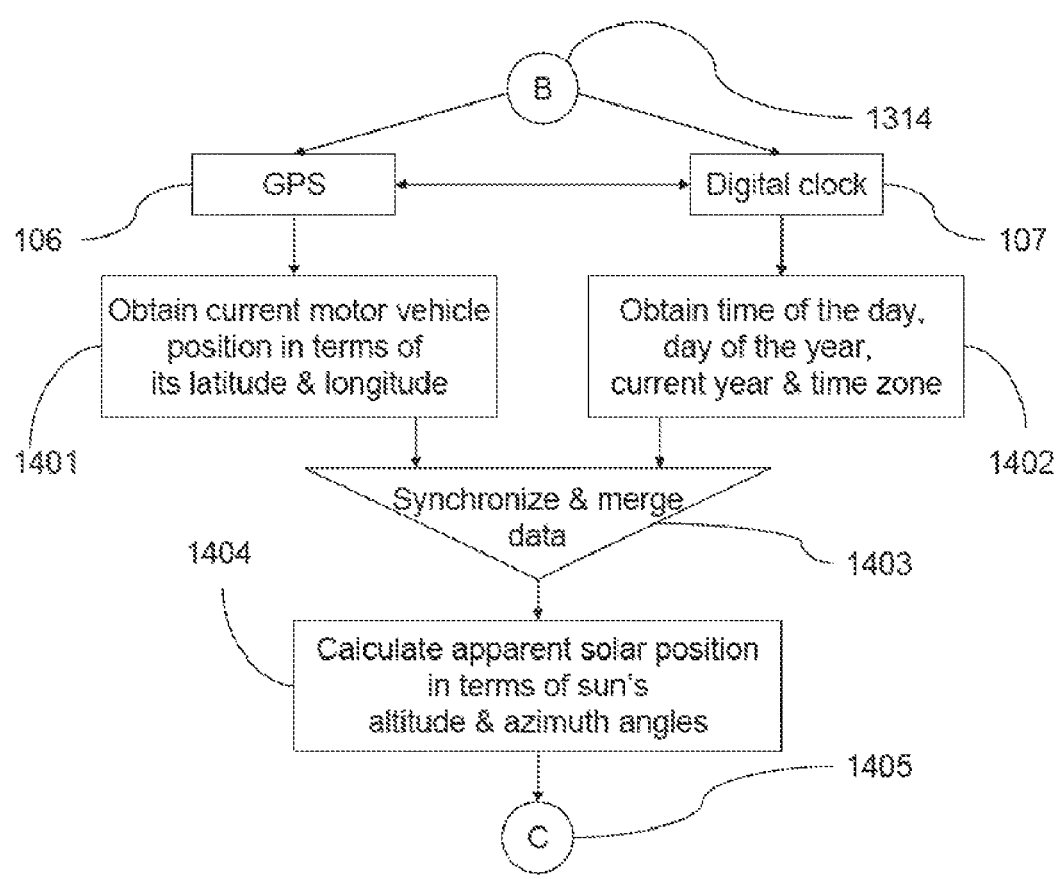
FIG. 14 is a flow diagram with steps for the calculation of the apparent solar position.

FIG. 14 is a block diagram that shows the system events, connectors, steps, and processes as well as their logical flows for the calculation of the apparent solar position 212 in terms of the solar altitude and solar azimuth angles 206. There are two parts to the calculation of the apparent solar position. The first part is the motor vehicle's absolute location on earth, defined by its latitude and longitude 202. The second part is the time zone, the time of day, the day of the year, and the current year 203 for the motor vehicle. Continuing from connector B 1314 in FIG. 13, the microcontroller 102 obtains the motor vehicle's position in terms of its latitude and longitude 202 from the GPS unit 106 in step 1401. Similarly, the microcontroller 102 uses the digital clock 107 in synchronization with the GPS unit 106 to obtain the time of day, day of the year, the current year, and the time zone 203 in step 1402. The data obtained in steps 1401 and 1402 are synchronized and merged in the process 1403. The calculation of the apparent solar position 212 in terms of the solar altitude and azimuth angles 206 is then carried out in step 1404. The result is then sent to the system process 1702 in FIG. 17 through connector C 1405.

Figure 15:
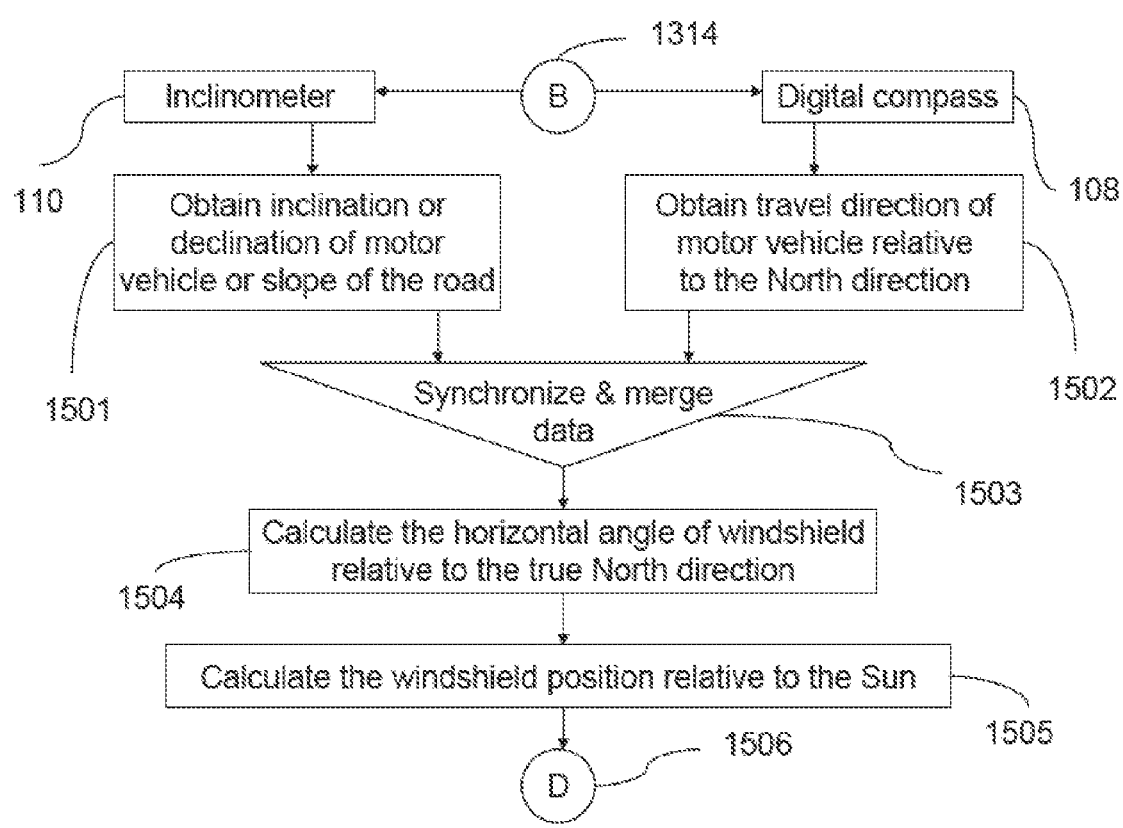
FIG. 15 is a flow diagram with steps for the calculation of the windshield position.

FIG. 15 is a block diagram that shows the system events, connectors, steps, and processes as well as their logical flows for the calculation of the windshield position relative to the Sun 214. There are two parts to this calculation. Continuing from connector B 1314 in FIG. 13, the microcontroller 102 obtains the angle of inclination or declination of the motor vehicle or slope of the road 205 in step 1501 from an inclinometer 110. Similarly, the microcontroller 102 uses a digital compass 108 to obtain the travel direction relative to the true North direction 204 in step 1502. Both sets of data are then synchronized and merged in step 1503. Calculation of the horizontal angle of windshield relative to the true North direction is carried out in step 1504. Then, calculation of the windshield position relative to the Sun 214 is carried out in step 1505. The result is sent to the system process 1702 in FIG. 17 through connector D 1506.

Figure 16:
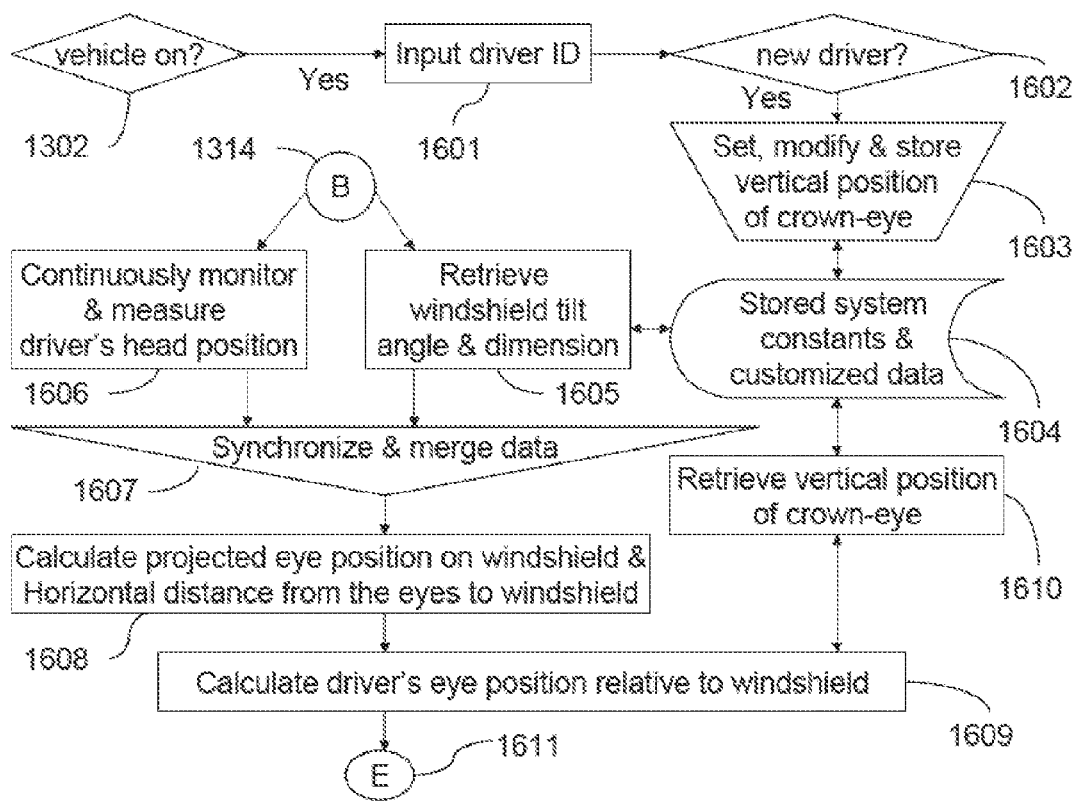
FIG. 16 is a flow diagram with steps for the calculation of the driver's eye position projected on the windshield.

FIG. 16 is a block diagram that shows the system events, connectors, decisions, steps, and processes as well as their logical flows for the calculation of the position of the driver's eyes relative to the windshield 213. If the result of the decision 1302 is "Yes," indicating the motor vehicle is on, the driver has an option to manually enter his or her identification (ID) 1601 using the input and control device 109. The driver's ID can be the driver's name or number recognized by the system 100. If no ID is entered, the last used ID or a default ID, representing the primary driver of the vehicle, on the stored customized data 1604 will be used. Then the decision 1602 checks whether the driver is a new user. If the answer is "Yes" on 1602, the new driver has the option to set or modify the vertical distance between his or her crown and eyes using the input and control device 109. Then, this crown to eye vertical distance is stored as the preset value of the customized data 1604 in the memory and storage unit 103. The memory and storage unit 103 can store this crown to eye vertical distance of several drivers in a household as the preset values of the customized data 1604. Continuing from connector B 1314 in FIG. 13 to step 1605, the microcontroller 102 retrieves the windshield tilt angle and its dimensions from the stored value of the system constants 1604. Similarly, the microcontroller 102 measures the driver's crown position using a distance sensor 111 mounted on the ceiling above the driver's seat, and the driver's forehead position using a position sensor 112 mounted along the driver's door or side panel in step 1606. These two sets of data are synchronized and merged in step 1607. Calculations of the driver's eye position in terms of the windshield's horizontal and vertical coordinates 210 when the driver's eyes are horizontally perpendicular projected on the windshield 101, and the horizontal perpendicular distance from the driver's eyes to the windshield 209 are carried out in step 1608. Calculation of the position of the driver's eyes relative to the windshield is carried out in step 1609. In both steps 1608 and 1609, the microcontroller 102 retrieves the vertical distance between the driver's crown and eyes from the stored preset value of the customized data 1604 based on the driver's ID in step 1610. If no preset value is found, a default value is retrieved from the stored system parameters 1604. The results are then fed to the system process 1702 in FIG. 17 through connector E 1611.

Figure 17:
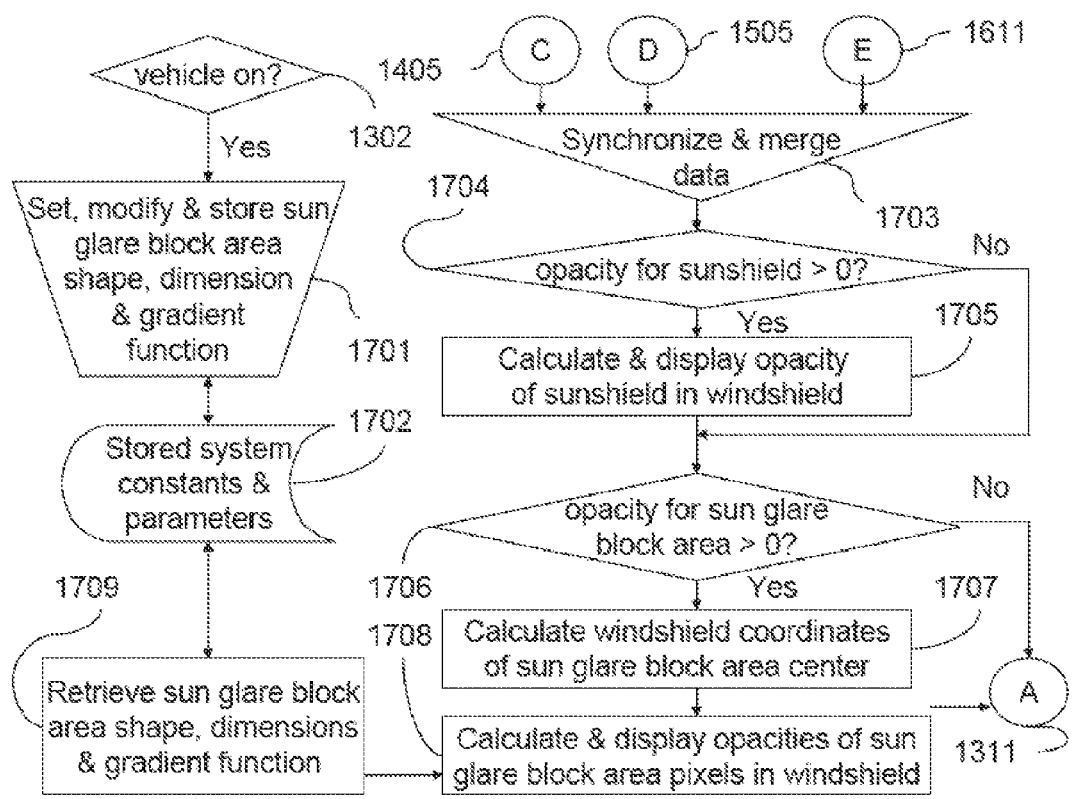
FIG. 17 is a flow diagram with steps for the calculation of the sun glare block area location and the opacities of its pixels, and the sunshield opacity.

FIG. 17 is a block diagram that shows the system events, decisions, connectors, steps, and processes as well as their logical flows for the calculation of the position and opacity of the sun glare block area 215 in the windshield 101. If the result of decision 1302 is "Yes," indicating the motor vehicle is on, the driver is allowed to set or modify the sun glare block area shape, dimensions, and gradient function 208 using the input and control device 109 in step 1701. These values are then stored as the preset values of the system parameters 1702 in the memory and storage unit 103. If no changes are entered by the user, the default or previously used shapes and dimensions are used. In step 1703, the microcontroller 102 synchronizes and merges all results of calculations from connector C 1405 in FIG. 14, connector D 1505 in FIG. 15, and connector E 1611 in FIG. 16. The decision 1704 checks whether the opacity for sunshield is greater than zero. If the result is "Yes" on 1704, the calculation and display of opacity for the sunshield on the windshield 101 is carried out at step 1705 and then the system process proceeds to decision 1706. If the result is "No" on 1704, the system process bypasses step 1705 and proceeds directly to decision 1706. Then, decision 1706 checks if the opacity for sun glare block area is greater than zero. If the result is "Yes" on 1706, the calculation of the horizontal and vertical coordinates of the center of the sun glare block area is carried out at step 1707. The calculation and display of the opacity for the sun glare block area on the windshield 101 is also carried out at step 1708. In step 1709, the microcontroller 102 retrieves the shape, dimension, and gradient function of the sun glare block area from the stored preset values of system parameters 1702 and then feeds these data to step 1708. If no preset values are found on 1702, default values will be retrieved from 1702 and used in step 1708. Then the system process will return to connector A 1311 in FIG. 13 since this is a continuous, automatic, and repetitive process whenever the motor vehicle is on. If the result is "No" on 1706, the system process will bypass both steps 1708 and 1709 and return directly to connector A 1311 in FIG. 13.

The microcontroller controls, retrieves data from and sends data to, communicates with other components, devices and sensors by a software program. The software program comprises of machine languages embedded in or built into the microcontroller, other components, devices, and sensors as the device drivers. Moreover, all mathematical calculations and algorithms in this invention can be carried by a software program written in any programming language, such as Visual Basic or Java, or any other means. The software program can be deployed in the microcontroller 102 or the optional microprocessor.

4. Advantages of the Invention

Based on the reverse calculations, the tuning mode of this system is used to set, calculate, or adjust system parameters or customized data, such as the vertical distance between the driver's crown and eyes. First, this tuning mode will display a sun glare block area in the windshield based on an average value of the vertical distance between the driver's crown and eyes. Second, the driver will use the tuning mode to adjust the position of the sun glare block area such that it is in line with the sun glare on the windshield when viewed by the driver, while the position of the driver's head is monitored and measured by sensors. Third, the tuning mode will calculate the vertical distance between the driver's crown and eyes based on the reverse calculations. Finally, this vertical distance will be stored and used for the automatic mode of this system. As a result, this system can be operated automatically and immediately after the installation without any requirements for the setup, configuration, customization, or input from the driver since the vertical distance between the driver's crown and eyes is the only required input to the system.

The advantages of the proposed system are listed below. First, the system encompasses all possible locations of intense sun glare on the windshield. Second, the system can darken the smallest area required to block the sun glare because the system uses an accurate method to calculate the precise position of the sun glare in the windshield, thus maintaining a clear and unobstructed view of the road. Third, the system can use a very dark central area of the sun glare block area to block the center of the sun glare because it uses an opacity gradient for the sun glare block with decreasing opacity from its center to its edge. The system displays a borderless sun glare block area by matching and blending the opacity at its edge with the opacity of the sunshield. Both of these features provide more comfort to the driver's eyes from the sun glare and at the same time maintain a larger area of clear vision for the road. Fourth, the system functions correctly at any location on earth and at any time of day, any day of the year and any year. Fifth, the system also functions correctly for any direction of travel and on roads of any slope. Sixth, the system does not require any specially built, sophisticated or complicated camera or sensor systems. It utilizes only the commonly and commercially available light intensity sensors, position and distance sensors, inclinometers and GPS for an increased reliability and lower costs. Seventh, it requires minimal vehicle modification; with no motor system or hardware adjustments or additions. Eighth, the system is self-sufficient, obtaining energy from the battery in the motor vehicle. Ninth, the system is fully automatic to maintain the driver's undivided attention in driving. Tenth, the system is completely independent of human monitoring, yet with the flexibility of a manual mode option to override certain functions and features. In the manual mode, the glare block can block glare from headlights of oncoming traffic, reflection from vehicles in the front, or from other sources. Eleventh, the system required parameters can be self adjusted by reverse calculations with the tuning mode. As a result, the system can be operated automatically and immediately after the installation of the system without any requirements for setup, configuration, customization, or input from the driver.

This invention will provide the driver with a system that will eliminate the risks of driving due to the sun glare. It will free the driver from the discomfort, frustration, and stress from blinding sun glare. It will also provide the driver with a clear and unobstructed view of the road. Being an automated system, it will conserve the driver's undivided attention to driving. The system is self-sufficient by obtaining energy from the battery in the vehicle and the electrochromatic glass is highly energy efficient. With this invented system implemented in motor vehicles, many accidents can be avoided and many lives can be saved.

Although the most important usage of this invention is in motor vehicles, which includes automobiles, buses, and trucks, it can be applied to other transportation vehicles, such as trains, airplanes, and motor boats. With constantly improving technology and drastically decreasing costs, this system will become increasingly affordable. Consequently, the system will become increasingly marketable and vehicle manufacturers will be encouraged to adopt and implement this system.

While the preferred embodiment to the invention has been described, it will be understood that those skilled in the art, both now and in the future, may make various improvements and enhancements that fall within the scope of the following claims. These claims should be constructed to maintain the proper protection for the invention first described.

The invention claimed is:

1. A system for an accurate calculation of a precise position and a display of a sun glare block area, and a display of a sunshield in a windshield in a transportation vehicle comprised of the following required components: a microcontroller, a memory and storage unit, a light sensor, a GPS unit, a digital clock, a digital compass, an inclinometer, a distance sensor, a position sensor, an input and control device, and the following optional components: power supply unit, microprocessor, and
   wherein the transportation vehicles comprises of automobiles, buses, light duty trucks, trucks, trains, and other road motor vehicles; and
   wherein the digital compass measures a compass North direction which is then converted to a true geographic North direction; and
   wherein the inclinometer monitors whether a road has an inclination or declination, and measures a slope of the road; and
   wherein the distance and position sensors measure a vertical distance between a driver's crown and a ceiling of the transportation vehicle and a horizontal perpendicular distance from a bottom edge of the windshield to a horizontal position of the driver's forehead; and
   wherein the memory and storage unit stores a vertical distance between the driver's crown and eyes entered by the driver or reverse calculated through a tuning mode; and
   wherein an eyes image position is determined from the vertical distance between the driver's crown and the ceiling of the transportation vehicle, the vertical distance between the driver's crown and eyes, and the horizontal perpendicular distance from the bottom edge of the windshield to the horizontal position of the driver's forehead; and
   wherein the microcontroller is configured to calculate the precise position of display of the sun glare block area and the sunshield based on the determined eyes image position; and
   wherein the light sensor monitors and measures a current ambient light intensity for a comparison with minimum ambient light intensity threshold values for the sun glare block area and the sunshield to trigger "on" or "off" for the display of the sun glare block area and the sunshield; and
   wherein the input and control device comprises of a required touch screen or pad wired on a dashboard, front or side panels, or a steering wheel of the transportation vehicle; and
   wherein the required components can be substituted with components that provide the same or similar measurements to be used in the calculation of the sun glare location on the windshield as viewed by the driver; and
   wherein the required components and the optional components are built as part of the transportation vehicle, embedded in the transportation vehicle, or added in the transportation vehicle as standalone components, devices or sensors.

2. The system according to claim 1, wherein the light sensor monitors and measures the current ambient light intensity, at least every tenth of a second while the transportation vehicle is powered on, for the comparison of the minimum ambient light intensity threshold values for the sun glare block area and the sunshield to trigger "on" or "off" for the display of the sun glare block area and the sunshield, in three different combinations: sun glare block area on, sunshield on; sun glare block area on, sunshield off; sun glare block area off, sunshield off; and
   wherein the current ambient light intensity is used to determine opacities of the sun glare block area and the sunshield for comfort of the driver's eyes; and wherein the threshold values for the sun glare block area and the sunshield comprise of default values and values selected or entered by the driver using the input and control device.

3. The system according to claim 1, is further comprised of three modes of operations: a default automatic mode, a manual mode, and a tuning mode; and wherein the manual mode further comprises control and selection of the position of the sun glare block area and the opacities of the sun glare block area and the sunshield using the input and control device; and wherein the tuning mode is used to set, calculate, and adjust customized data or system parameters using the input and control device; and wherein the tuning mode further comprises reverse calculation of the actual vertical distance between the driver's crown and eyes by adjusting the position of the sun glare block area based on a default or average vertical distance such that the position of the sun glare block area is in line with the sun glare on the windshield when viewed by the driver.

4. A method for an accurate determination of a precise position of a sun glare block area in a windshield in a transportation vehicle, deployed in a system for a display of a sun glare block area and a sunshield in a windshield in a transportation vehicle, comprises of the following required procedures:

retrieving a stored and previously measured windshield tilt angle relative to a horizontal level of the transportation vehicle whenever the transportation vehicle is powered on; and reading time of day adjusted for daylight savings time; day of year adjusted for leap year; and year from a digital clock, at least every tenth of a second while the transportation vehicle is powered on; and monitoring an absolute location of the transportation vehicle in terms of its latitude and longitude coordinate positions with a GPS unit, at least every tenth of a second while the transportation vehicle is powered on; and determining, by a microcontroller, an apparent position of the Sun in terms of its solar zenith or altitude angle, and its solar azimuth angle from the following parameters: the time of day adjusted for daylight savings time; the day of year adjusted for leap year; the year; the absolute location of the transportation vehicle in terms of its latitude and longitude at least every tenth of a second while the transportation vehicle is powered on; and monitoring a windshield position in terms of a direction of travel relative to a true geographic North direction adjusted from a compass North direction by a digital compass, at least every tenth of a second while the transportation vehicle is powered on; and monitoring a slope of a road in terms of an angle of inclination or declination relative to a horizontal sea level by an inclinometer, at least every tenth of a second while the transportation vehicle is powered on; and determining, by the microcontroller, a position of a driver's eyes in terms of its image position when projected onto the windshield along a horizontal eye level, at least every tenth of a second while the transportation vehicle is powered on; and determining, by the microcontroller, a horizontal perpendicular distance from the driver's eyes to the windshield, at least every tenth of a second while the transportation vehicle is powered on; and determining, by the microcontroller, a distance across a width of the windshield between a center position of the sun glare block area and a position of the image of the driver's eyes horizontally projected from the driver onto the windshield, at least every tenth of a second while the transportation vehicle is powered on; and determining, by the microcontroller, a distance along a surface of the windshield between the center position of the sun glare block area and the position of the image of the driver's eyes horizontally projected from the driver onto the windshield, at least every tenth of a second while the transportation vehicle is powered on; and determining, by the microcontroller, the precise position of the sun glare block area in the windshield based on the determined position of the driver's eyes, the determined horizontal perpendicular distance, the determined distance across the width of the windshield and the determined distance along the surface of the windshield, at least every tenth of a second while the transportation vehicle is powered on.

5. The method of claim 4, further comprising a set of different formulae or equations for all possible conditions comprises:

whether the sun glare block area is on a left or right side of a direct line of sight perpendicular to the windshield from the driver's eyes horizontally to the windshield; and whether the sun glare block area is on the left or right side of the direct line of sight from the driver's eyes towards the true geographic North direction; and wherein whether the road is inclined or declined.

6. A method for determining an image position of a driver's eyes on a windshield in a transportation vehicle and displaying a sun glare block area and a sunshield in a windshield of the transportation vehicle, comprises of the following:

determining, by a microcontroller, an image position of a driver's eyes from a vertical position between the driver's head and a ceiling of the transportation vehicle, which is measured by a distance sensor mounted on the ceiling's interior above a seat for the driver, and a vertical distance between the driver's crown and eyes, at least every tenth of a second while the transportation vehicle is powered on; and determining, by the microcontroller, a horizontal perpendicular distance from a bottom edge of the windshield and a horizontal position of the driver's forehead, which is monitored, measured, and determined using a position sensor mounted along a door or body panel adjacent to the driver, or by a distance sensor mounted on an upper edge of the windshield, at least every tenth of a second while the transportation vehicle is powered on; and determining, by the microcontroller, the image position of the driver's eyes on the windshield when the driver's eyes are projected onto the windshield along a horizontal eye level, and a horizontal perpendicular distance from the image position of the driver's eyes to the windshield.

* * * * *